United States Patent
Devehat

[19]

[11] Patent Number: 5,979,487
[45] Date of Patent: Nov. 9, 1999

[54] MANUAL SELECTIVE CONNECTION INSTALLATION WHICH CAN BE CLEANED BY SCRAPING

[75] Inventor: Eugene Le Devehat, Saligny, France

[73] Assignee: FMC Corporation, Chicago, Ill.

[21] Appl. No.: 08/765,730

[22] PCT Filed: Jul. 6, 1995

[86] PCT No.: PCT/FR95/00904

§ 371 Date: Mar. 20, 1997

§ 102(e) Date: Mar. 20, 1997

[87] PCT Pub. No.: WO96/01785

PCT Pub. Date: Jan. 25, 1996

[30] Foreign Application Priority Data

Jul. 11, 1994 [FR] France .................................. 94 08555

[51] Int. Cl.⁶ .............................. B67D 5/00; B65B 3/04
[52] U.S. Cl. .......................... 137/271; 137/615; 141/84
[58] Field of Search ................... 137/269, 270, 137/271, 615; 141/84, 387, 392, 284

[56] References Cited

U.S. PATENT DOCUMENTS

| | | | |
|---|---|---|---|
| 3,896,841 | 7/1975 | Bahlke | 137/271 |
| 3,974,864 | 8/1976 | Fournier et al. | 137/615 X |
| 4,844,133 | 7/1989 | Von Meyerinck et al. | 137/615 X |

*Primary Examiner*—Kevin Lee
*Attorney, Agent, or Firm*—Henry C. Query, Jr.

[57] ABSTRACT

A plant comprising a post (2') with fixed sections attached thereto at various heights, and a horizontally distortable articulated pipe (3') attached to each of said sections. Other fixed sections (B'1 ... B'19) are arranged on a single level along a substantially horizontal reference line (L'). The end of each pipe is connected to a tubular column (8') extending up to the reference line. Each column is movable along the reference line and may be shifted transversely so that the columns can pass one another in the vicinity of said line. Said plant is particularly useful in the oil industry.

19 Claims, 12 Drawing Sheets

MANUAL SELECTIVE CONNECTION INSTALLATION WHICH CAN BE CLEANED BY SCRAPING

The invention concerns an installation for selectively connecting any one of a plurality of input pipes to any one of a plurality of output pipes. It is particularly, but not exclusively, directed to the circulation of petroleum products.

In most installations producing oil or chemical products it is necessary to make many temporary connections in order to transfer products of different kinds in the same pipes. To this end it is necessary to be able to connect any one of a plurality of input lines to any one of a plurality of output lines, the numbers of input and output lines possibly being large, for example in the order of 20 or even more.

These multiple connections are unavoidable in the case of installations which can be cleaned by scraping (i.e. in which the internal cross-section of the fluid passage is the same everywhere).

There are various existing solutions to the problem of making these connections.

The first is to use flexible connections (hoses).

There are other solutions, usually automated, which use telescopic connections, which can cause problems with cleaning by scraping.

The Applicant has already proposed the following solutions:
  connections with double articulated joints in two perpendicular planes (see patent application 90-03050 of Mar. 9, 1990),
  connections with multiple tubular members mobile in two stacked planes in the manner of abacus members and joined by a double elbow (see patent application FR-A-2 680 559 of Aug. 21, 1991).

These automated solutions have the drawback of being relatively costly and are therefore ruled out in some projects for budgetary reasons.

It is therefore necessary to propose economical, possibly manual solutions to the problem of making multiple connections (multiple input lines connected to multiple output lines) in a way that enables cleaning by scraping.

These solutions must use rigid members which can be manoeuvred without major physical effort and which can be cleaned by scraping.

It must be possible to connect simultaneously all the input lines (or all the output lines if they are fewer in number), in any order, and without having to disconnect any line(s) already in service.

To this end the invention proposes an installation for provisional selective connection of any one of an ordered plurality of first fixed sections all having the same inside diameter to any one of an ordered plurality of second fixed sections all having the same inside diameter as the first fixed sections, including:
  a vertical first support to which the plurality of fixed sections is fixed, each at a specific level,
  an ordered plurality of articulated pipes all having the same inside diameter as the first and second fixed sections, deformable independently of each other in stacked horizontal planes, a specific articulated pipe being connected to each first fixed section,
  a first ordered plurality of first coupling sections all having the same inside diameter as the first and second fixed sections and coupling flanges in an imaginary coupling plane (P), the number of first coupling sections being equal to the number of first fixed sections,
  a support to which the second ordered plurality of second fixed sections is fixed,
  a second ordered plurality of second coupling sections all having the same inside diameter as the first and second fixed sections and coupling flanges parallel to the imaginary coupling plane, the number of second coupling sections being equal to the number of second fixed sections,
  a plurality of couplers each adapted to couple a first coupling section and a second coupling section, which installation is characterised in that:
    each second coupling section is connected directly to a second fixed section, said second coupling sections having fixed positions parallel to the imaginary coupling plane and being regularly arranged facing a substantially horizontal reference line in said plane at a level below the level of the first sections,
    each articulated pipe is connected, at the end opposite the end connected to the first section to which it is connected, to a tubular column having the same inside diameter as the first and second fixed sections and extending vertically as far as a respective first coupling section, the respective lengths of the tubular columns being such that the first coupling sections are all at substantially the same level, each combination of a pipe, a tubular column and a first coupling section being provided with means for limiting movement of said combination along the whole of the reference line to within a given range of horizontal movement to either side of said reference line,
    the distance between adjacent second coupling sections and the given range of movement being greater than the diameter of the first coupling sections.

In accordance with preferred features of the invention:
the imaginary coupling plane is horizontal,
each articulated pipe is formed of three rigid sections articulated to each other,
the reference line is substantially rectilinear,
the ends of the articulated pipes are inserted in respective carriages sliding on substantially horizontal coplanar rails in a vertical plane substantially parallel to the reference line,
said given range of movement is delimited at least in part by abutments carried by said ends and cooperating with said carriages,
the vertical support and the plurality of first fixed sections are divided into two sets on respective sides of a vertical plane through the rectilinear reference line,
the reference line is part of a circle,
each articulated pipe is formed of three rigid sections articulated together and includes a spacer link articulated to the end rigid sections the same length as the median rigid section and forming a pantograph with the rigid sections,
the end rigid section to which a tubular column is connected is oriented radially,
the second coupling sections are mounted telescopically on the second fixed sections, perpendicularly to the imaginary coupling plane,
the telescopic second sections are provided with pivoting manoeuvring levers,
the second coupling sections include two jaws articulated at first ends to said second coupling sections perpendicular to the imaginary coupling plane and a locking device adapted to hold second ends of the jaws in a closed configuration, the locking device comprises clamping means, the clamping means are operated by a lever, the locking device is articulated to the second end of one jaw, the second coupling sections include sensors for identifying the first coupling sections, a plug is disposed between a first coupling section and a second coupling section held in a bottom position.

Objects, features and advantages of the invention emerge from the following description given by way of non-limiting example with reference to the appended drawings in which:

FIGS. 1 through 5 show the whole of a provisional selective connection installation for connecting any one of an ordered plurality of first fixed sections A1, A2, . . . , A10 all having the same inside diameter to any one of an ordered plurality of second fixed sections B1, B2, B3, . . . , B21 all having the same inside diameter as the first fixed sections.

This installation includes:

a vertical first support 2 to which the plurality of fixed sections is fixed, each at a specific level between levels Hmin and Hmax;

an ordered plurality of articulated pipes 3A, 3B, 3C, . . . , 3J having the same inside diameter as the first and second fixed sections, deformable independently of each other in stacked horizontal planes, a specific one of the articulated pipes being connected to each first section, a first ordered plurality of first coupling sections 4A, . . . , 4J having the same inside diameter as the first and second fixed sections and coupling flanges in an imaginary coupling plane (P), the number of first coupling sections being equal to the number of first fixed sections, a support 5 to which the second ordered plurality of second fixed sections is fixed, a second ordered plurality of second coupling sections 6A, . . . , 6U having the same inside diameter as the first and second fixed sections and coupling flanges parallel to the imaginary coupling plane P, the number of second coupling sections being equal to the number of second fixed sections, a plurality of couplers 7 (see also FIGS. 12 through 17) each adapted to couple a first coupling section and a second coupling section.

Figure 5:
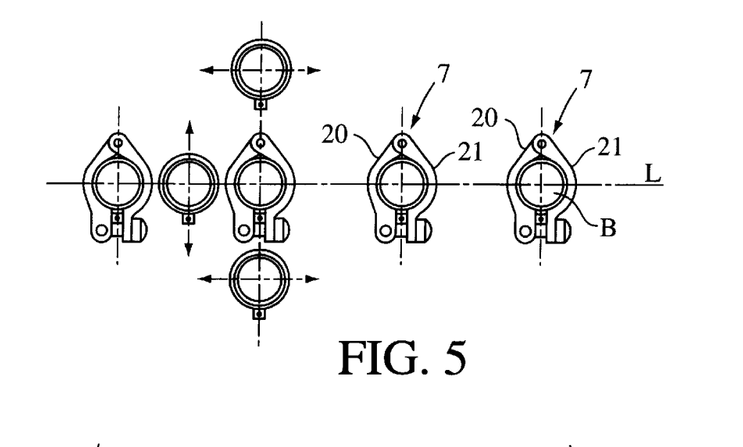
FIG. 5 is a plan view of part of the second coupling sections and of three first coupling sections in course of displacement.

In accordance with various features of the invention:

each of the second coupling sections 6A, . . . , 6U is connected directly to one of the second fixed sections B1, . . . , B21, these second coupling sections having fixed positions parallel to the imaginary coupling plane and being regularly arranged facing a substantially horizontal reference line L in said plane P and having a level HL lower than the levels of the first sections, each of the articulated pipes 3A, . . . , 3J is connected at the end opposite the end connected to the first section to which it is connected to a tubular column 8A, . . . , 8J having the same inside diameter as the first and second fixed sections and extending vertically as far as a respective first coupling section 4A, . . . , 4J, the respective lengths of the tubular columns being such that the first coupling sections are all at substantially the same level (that of the reference line), each combination of a pipe, a tubular column and a first coupling section being provided with means for limiting relative movement of this combination along all of the reference line to within a given range of horizontal relative movement to either side of said reference line (see below), the distance between adjacent second coupling sections and the given range of angular movement is greater than the diameter of the first coupling sections (see FIG. 5).

In this example the imaginary coupling plane P is horizontal. It could instead be inclined or even vertical.

In this example each articulated pipe 3A, . . . , 3J is formed by three rigid sections articulated to each other.

The reference line L is substantially rectilinear.

The ends of the articulated pipes are inserted by means of rods 12A, . . . , 12J into respective carriages 10A, . . . , 10J provided with bearings for the rods and sliding on rails 11A, . . . , 11J which are substantially horizontal and coplanar in a vertical plane PV substantially parallel to the reference line. These rails support and guide horizontal movement of the carriages 10A, . . . , 10J.

Said given range of movement is delimited at least in part by abutments 14, 15 carried by said ends and cooperating with said carriages (in this example with the bearings).

To stiffen the pipe-column connection an inclined spacer 16B, . . . , 16J is fixed to the end of the articulated pipe and to the associated column.

The system shown thus comprises a set of articulated links made up of:

a fixed member A1, A2, etc with its coupling flange attached to a support structure 5, three mobile members linked together by rotation joints to form articulated arms 3A, etc, the last member curving downwards to form a vertical tube adapted to be connected to any one of the fixed outlet pipes B1, B2, etc. It is provided with a system of guidance in two mutually perpendicular directions:

lengthwise of and transversely to the line along which the fixed support pipes are disposed.

In the vertical plane PV each rail provided with a guide carriage attached to the vertical column or tube enables displacement towards the right or towards the left over the width of the assembly (over the entire length of the reference line).

In a plane perpendicular to the plane PV the rod 12A, etc or sliding guide enables the vertical tube to move from the front towards the rear over a limited distance. This enables positioning of the vertical tube either in front of or behind the fixed pipes.

The function of this guide is important to manoeuvring of the whole system since, depending on the lines already in service and the location of the line to be connected, the vertical tube can be moved without interfering with lines already connected only (see FIG. 5):

either on the inside (in front) if the line being manoeuvred is at a level lower than the level of the connected line, or on the outside (to the rear) if the line being manoeuvred is situated at a level higher than the level of the connected line.

The other members of the articulated connection are disposed so that they never interfere with each other when they move.

The length of the vertical tube is adapted for each connection so that the point of connection is always at the level of the connecting coupling on the fixed pipes, on the exit side of the installation.

These fixed output pipes, arranged in a line, are equipped with two devices (see FIGS. 12 through 17).

The first of these devices is a quick-connect coupler for connecting the vertical mobile tube to the fixed pipework and disconnecting it therefrom. This coupler comprises two jaws or half-flanges 20–21, etc articulated about a fixed axis perpendicular to the coupling plane P and a coarse thread screw-nut system 22 for quick locking and clamping. This arrangement enables opening of the coupler in two stages:

unclamping of the two half-flanges by moving the handle 23 into the opening position; the coupler is no longer sealed but the pipes are still held in place as a safety precaution (against accidental opening of a line under pressure), opening of the two half-flanges after pivoting of the screw-nut system 22.

An inductive sensor 24 attached to the part 25 to which the half-flanges are articulated senses and identifies the vertical pipe connected.

The coupler assembly is advantageously mounted on a telescopic section constituting one of the aforementioned second coupling sections moved between top and bottom positions by a lever 26 articulated transversely to one of the fixed sections B, etc.

This movement moves the coupling flange of the coupler away from the coupling flange on the vertical tube to enable the latter to be moved without interfering with the coupler.

A plug 27 adapted to be clamped by the coupler hermetically seals a line when it is to remain out of service. A guide groove 28 in the plug holds the unused vertical tube in the rest position.

This plug is also a valuable safety measure in the event of accidental pressurisation of a line that is not used or activation of the cleaning scraper.

As an alternative to this, if the number of vertical tubes must be greater than ten, to avoid an excessive length of vertical tube a second set of inputs and pipes can be installed facing the first (see FIG. 6), on opposite sides of the row of fixed outlet pipes B, etc.

A connection sequence can proceed as follows, if mobile (input) line No X must be connected to fixed line No Y (the mobile line is in the rest position on the plug).

1. The operator moves the vertical tube to the rear, so that it can be guided to the right or the left, depending on the position of fixed line No Y.

2. To reach this position, it is necessary to avoid any interference with the lines which are in service or in the rest position; the distance between the centre lines of the fixed lines is sufficient to allow movement to the front and to the rear of a vertical tube between two adjacent lines in service (extreme case).

The operator displaces the vertical tube and moves it around (in front of or behind) any connected lines it encounters as it is moved.

3. Connection of the mobile vertical tube to the fixed pipework:

opening of the coupler, displacement of the connecting flange of the telescopic section using the lever, closing of the two half-flanges of the coupler, fitting and tightening of the screw-nut system.

Disconnection requires the converse operation and fitting of the plug.

Figure 7:
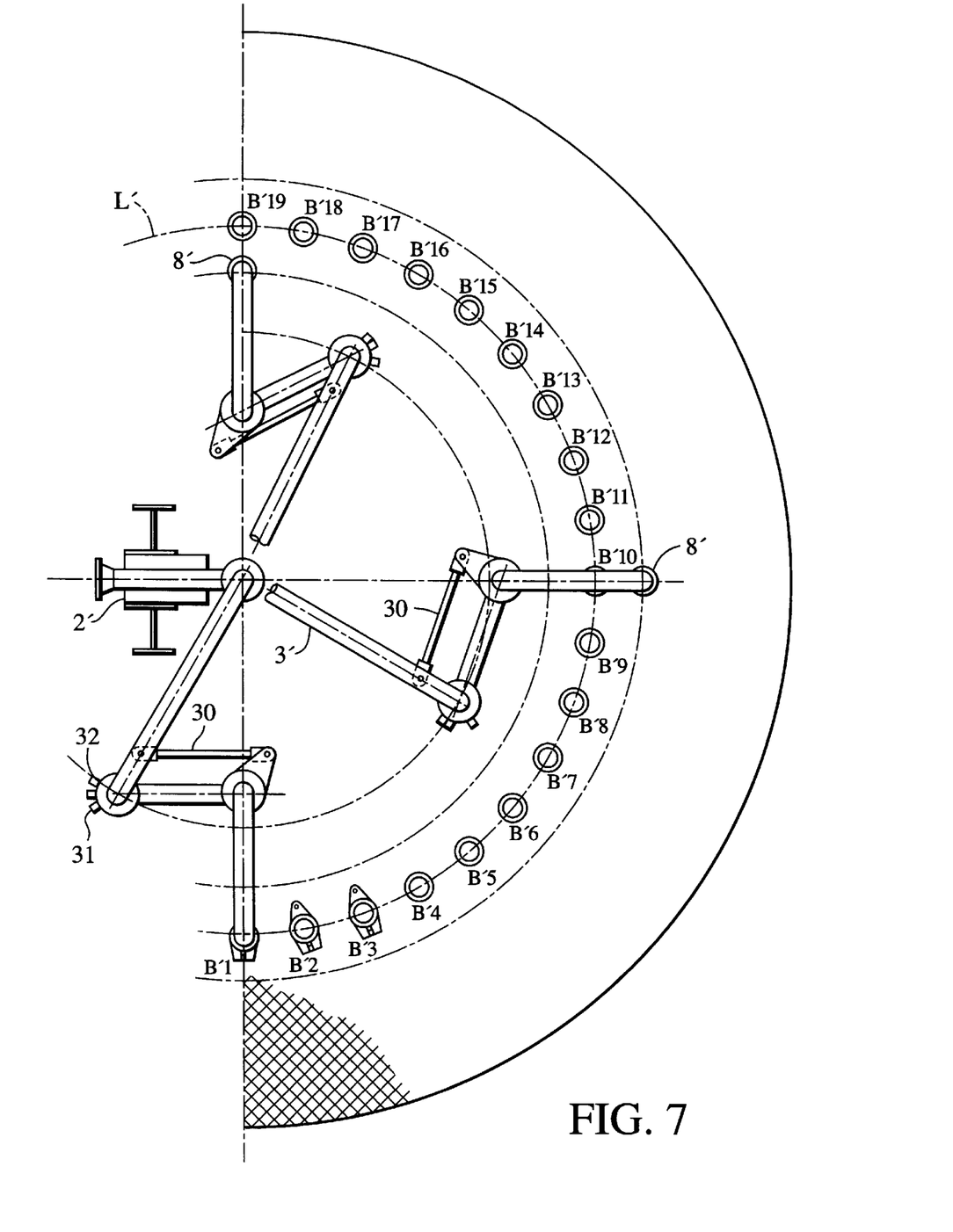
FIG. 7 is a plan view of another provisional selective connection installation in which the fixed second sections are arranged in a circle around the fixed first sections.
Figure 8:
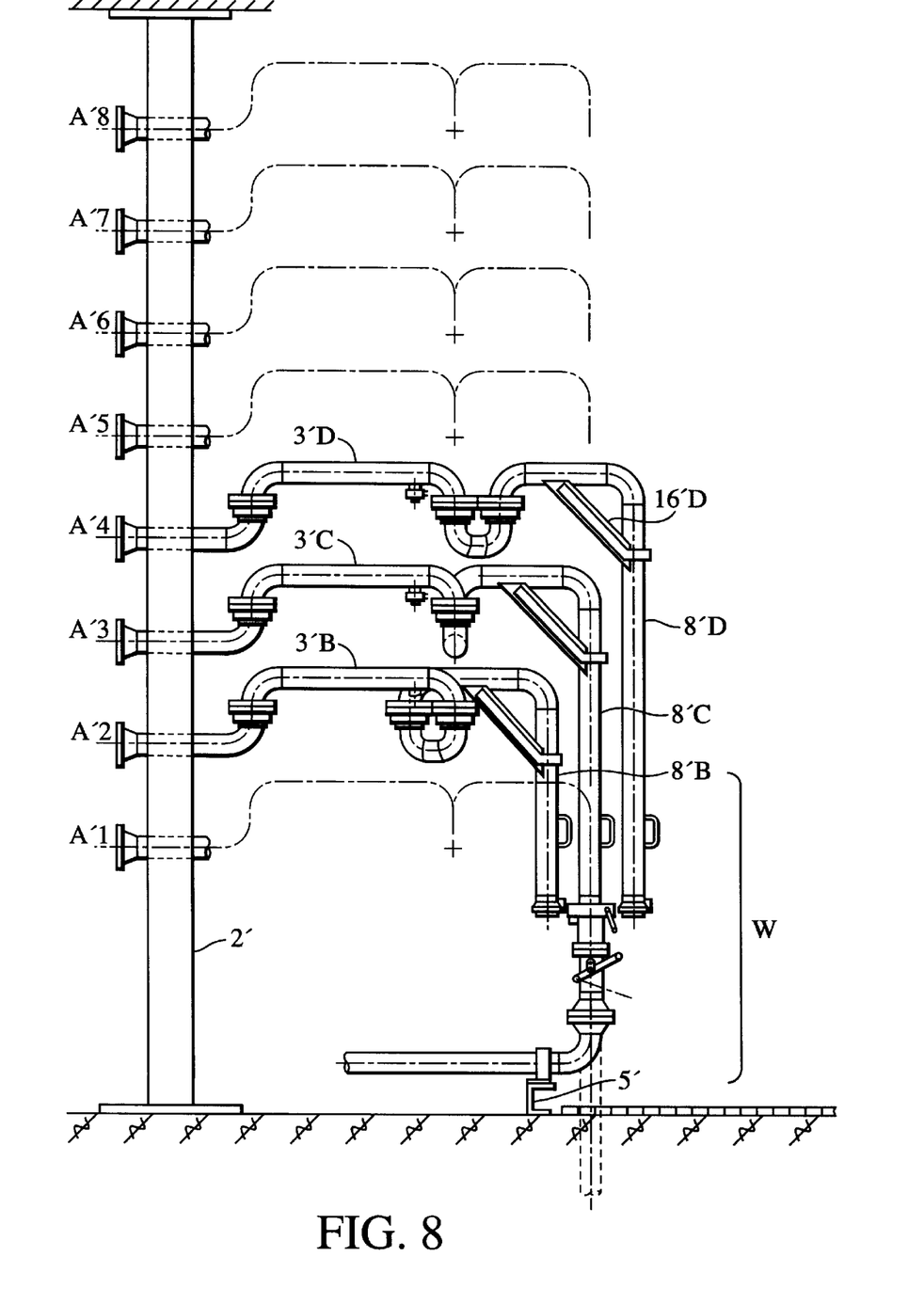
FIG. 8 is a partial side view showing a plurality of tubular columns in course of displacement.
Figure 9:
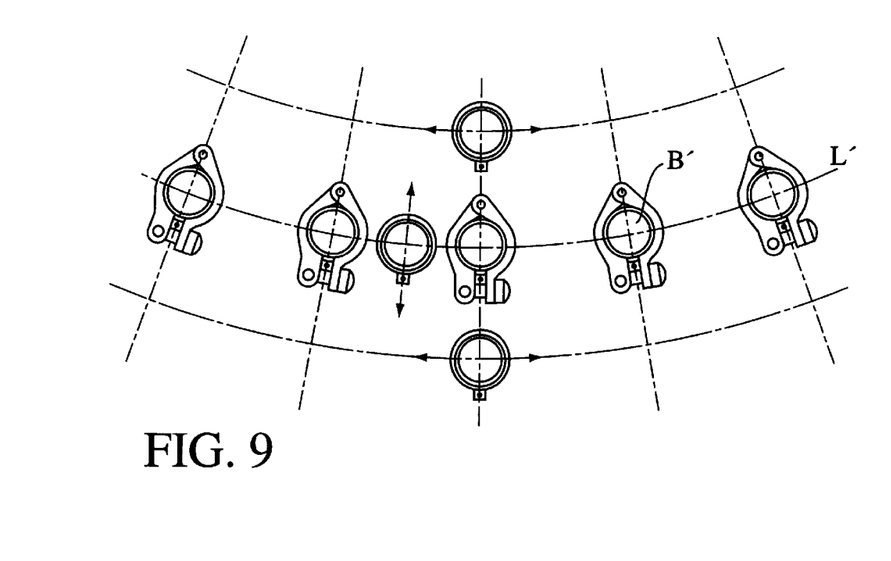
FIG. 9 is a partial plan view of this other installation, similar to FIG. 5.
Figure 10:
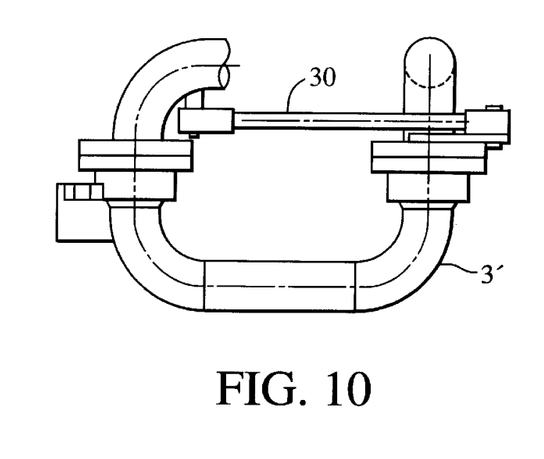
FIG. 10 is a partial side view of one of the articulated pipes from FIG. 7.
Figure 11:
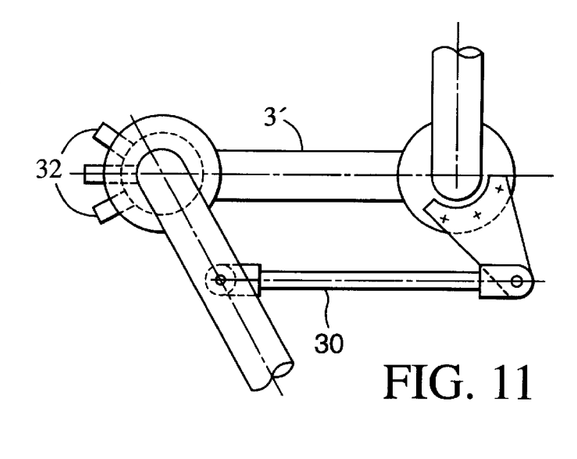
FIG. 11 is a plan view of the latter.
Figure 12:
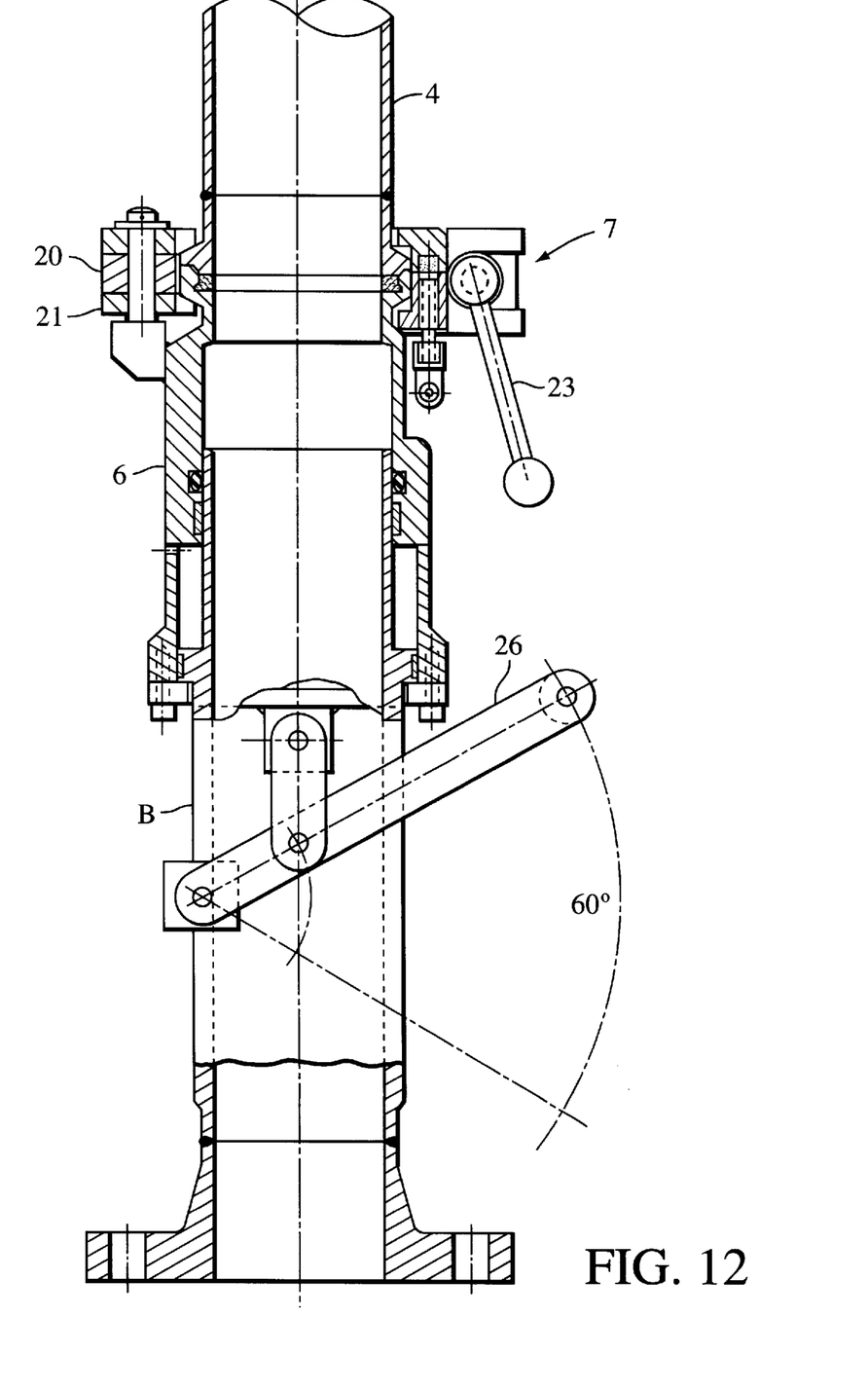
FIG. 12 is a side view partly in cross-section of a first coupling section connected to a second coupling section by a coupler.
Figure 13:
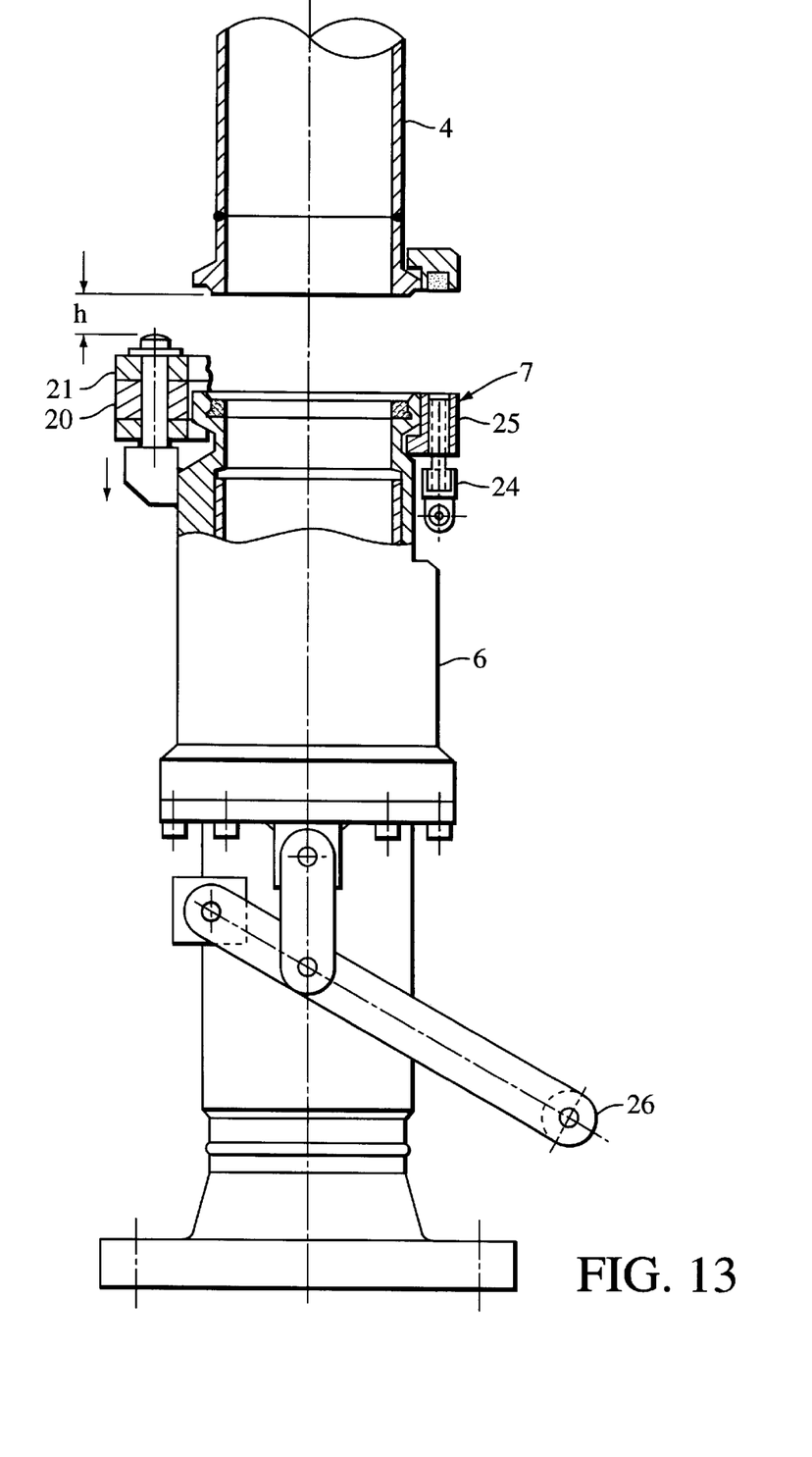
FIG. 13 is a side view partly in cross-section of the sections from FIG. 12 in a release configuration.
Figure 14:
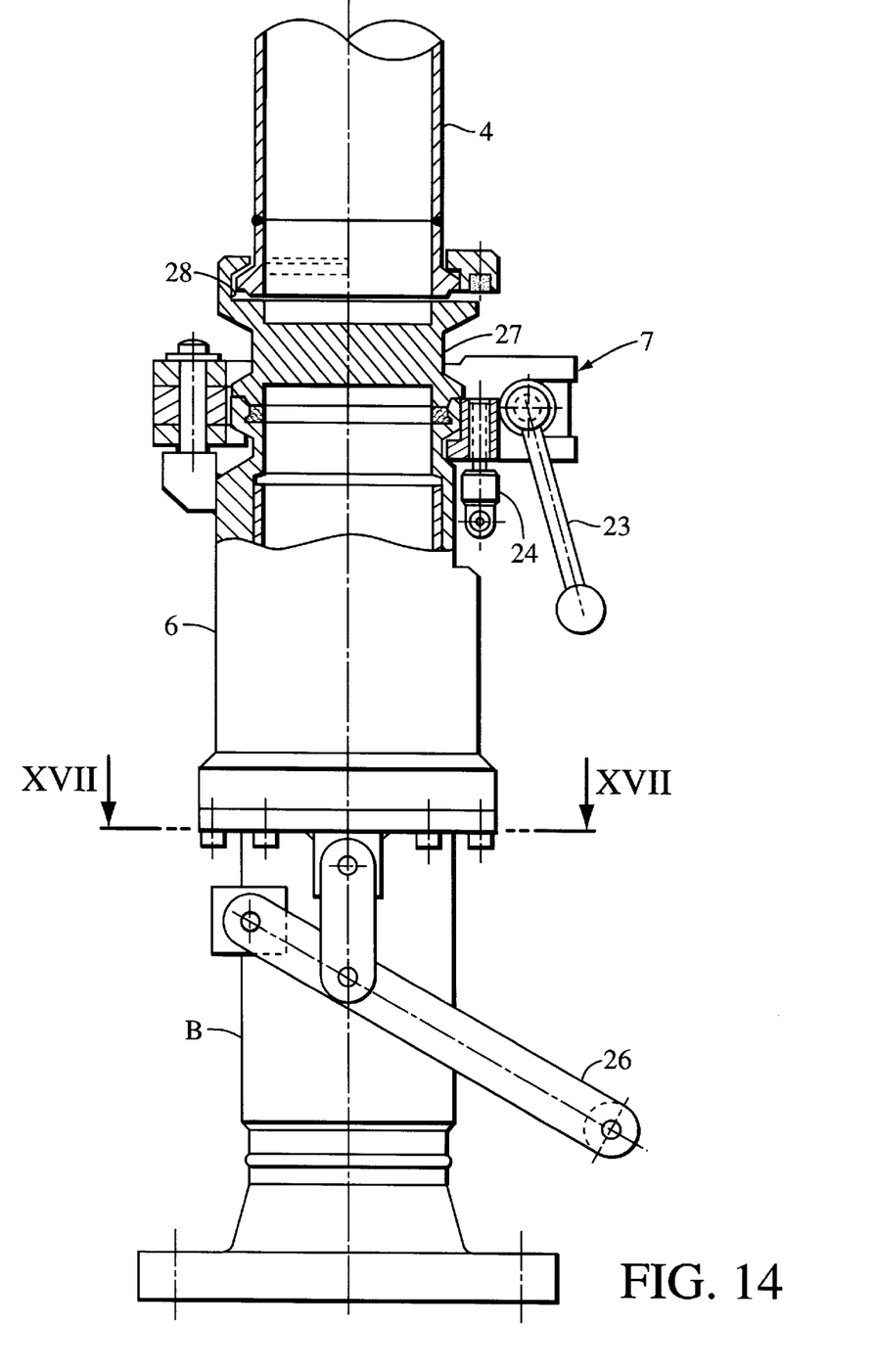
FIG. 14 is a side view partly in cross-section of the sections from FIG. 12 in a rest configuration.
Figure 15:
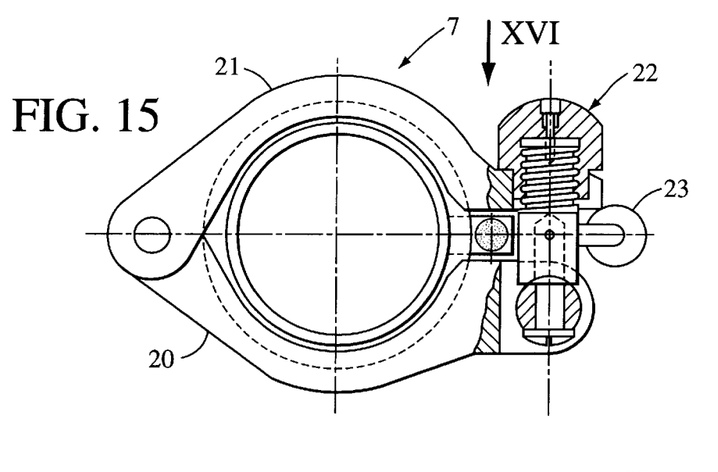
FIG. 15 is a partly cut away plan view of the coupler from FIGS. 12 through 14.
Figure 16:
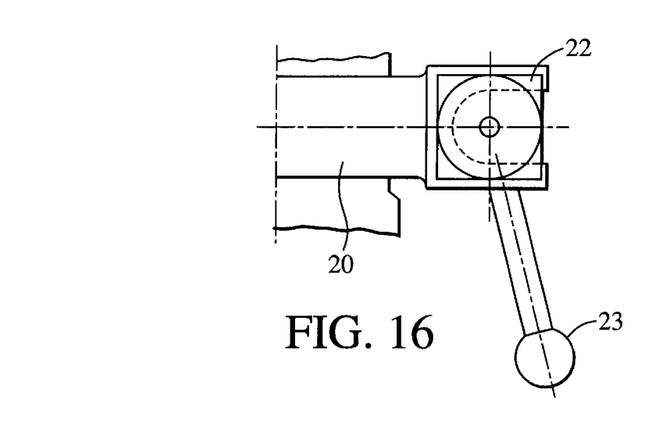
FIG. 16 is a partial view in the direction of the arrow XVI in FIG. 15.
Figure 17:
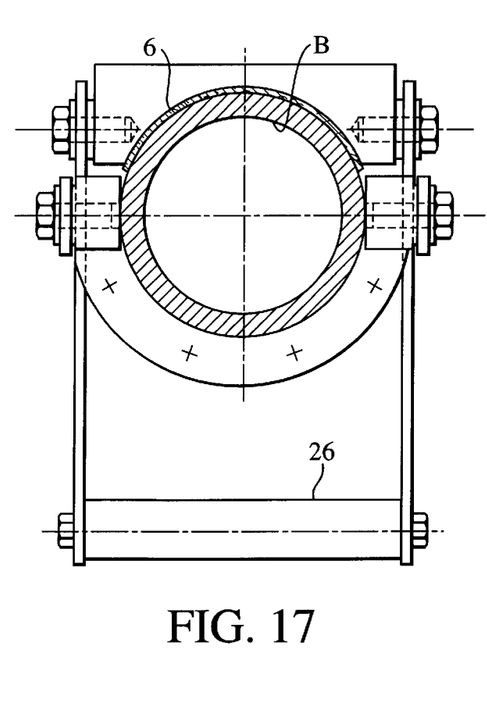
FIG. 17 is a view in cross-section on the line XVII—XVII in FIG. 14.

In an alternative embodiment shown in FIGS. 7 through 9 the reference numbers are the same but "primed". This alternative embodiment entails:

dispensing with the horizontal guides, installing the output lines in a circle around a central point at which is located the (fixed) first articulation of the articulated pipes, equipping the articulated pipes 3' with a link 30 fastening the outer section to the inner section, in parallel with the median section so as to form at least approximately a deformable parallelogram or pantograph, installing abutments to limit relative movement of the vertical tube in the plane perpendicular to the fixed rotation. These abutments 31, 32 limit relative movement to the inside and outside crossing position.

Operation of this embodiment can be deduced from the above description of the operation of the first embodiment.

The advantages of this embodiment are as follows:

reduced cost (through the elimination of the guide systems), the pantograph produces a rigid coupling by fastening the section carrying the vertical connecting tube, giving the latter a fixed orientation relative to the centre of the circle, preferably a radial orientation, right-left movement entrains only the first fixed rotation, front-back movement is always by pushing or pulling along an axis which always passes through the first fixed rotation. This prevents any spurious force which could otherwise tend to displace the connection as a whole in one direction or the other (to the right or to the left).

However, because the horizontal guidance is dispensed with, the length of the articulated connections is limited and consequently the possible number of fixed connection points is small. However, there are many applications in which this is acceptable.

The figures show the area W in which an operator works. The first coupling sections 4A, etc are advantageously provided with handles 40.

Figure 1:
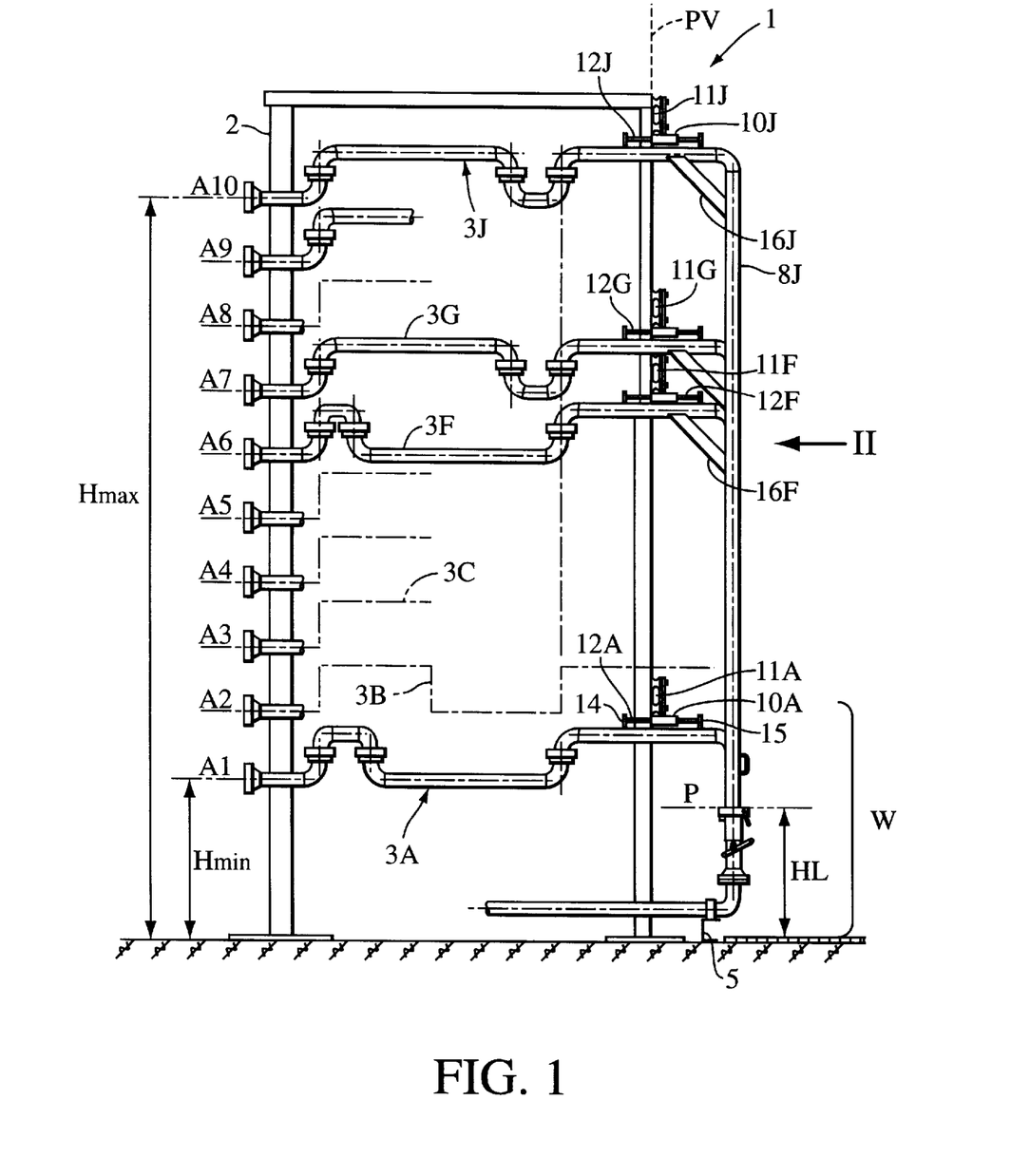
FIG. 1 is a side view of a provisional selective connection installation in accordance with the invention.
Figure 2:
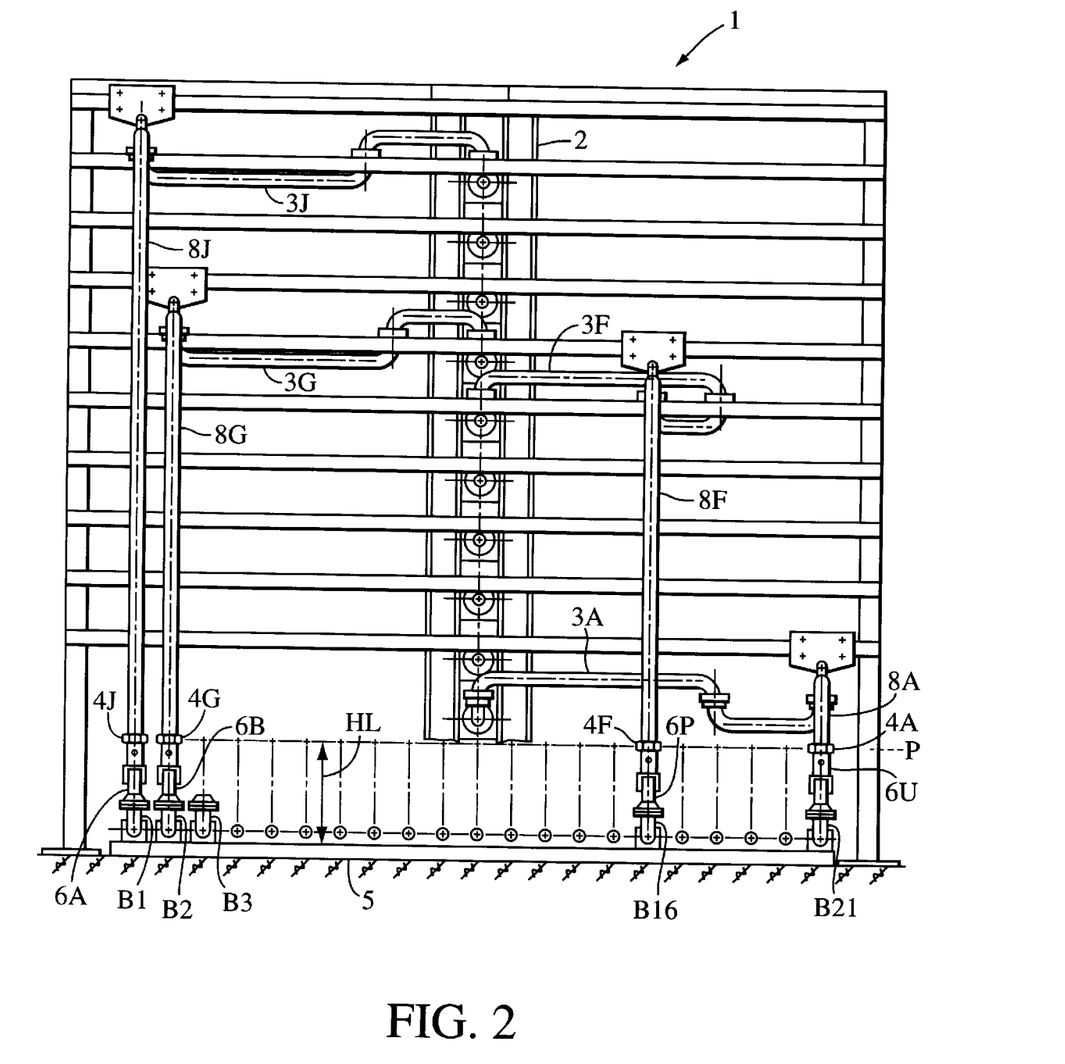
FIG. 2 is a front view of it as seen in the direction of the arrow II in FIG. 1.
Figure 3:
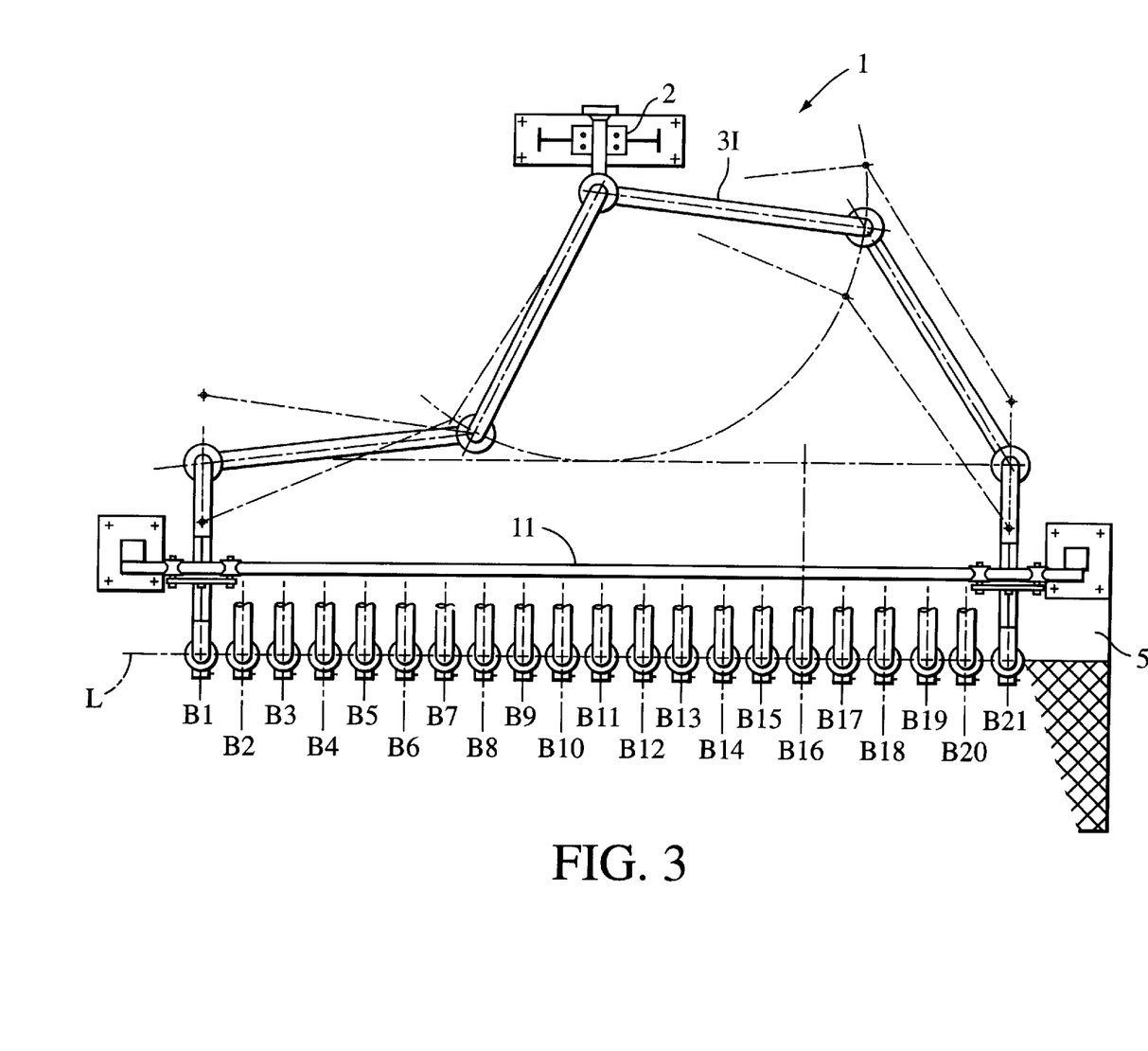
FIG. 3 is a plan view of it.
Figure 4:
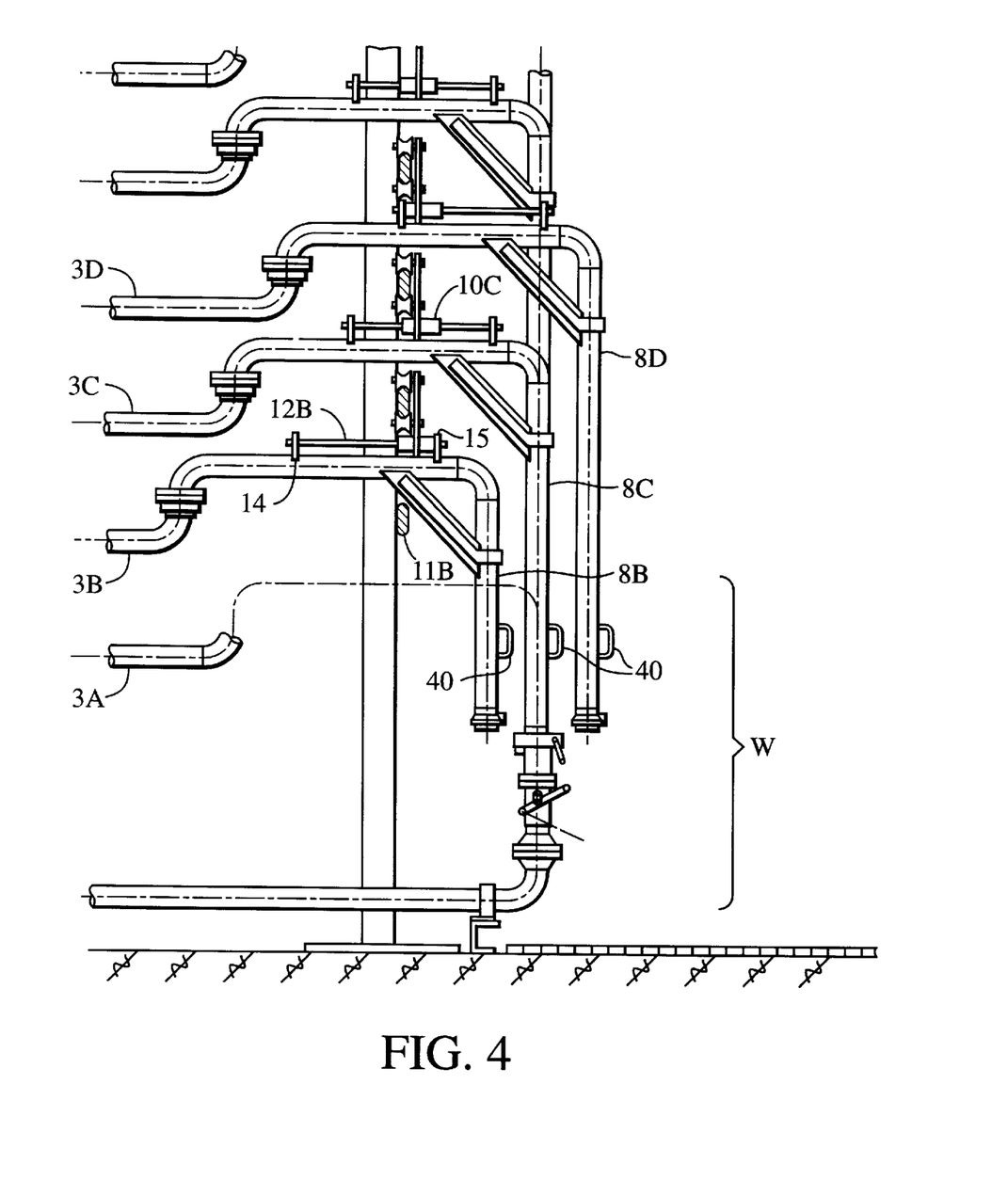
FIG. 4 is a partial side view of it, showing several tubular columns in the course of displacement.
Figure 6:
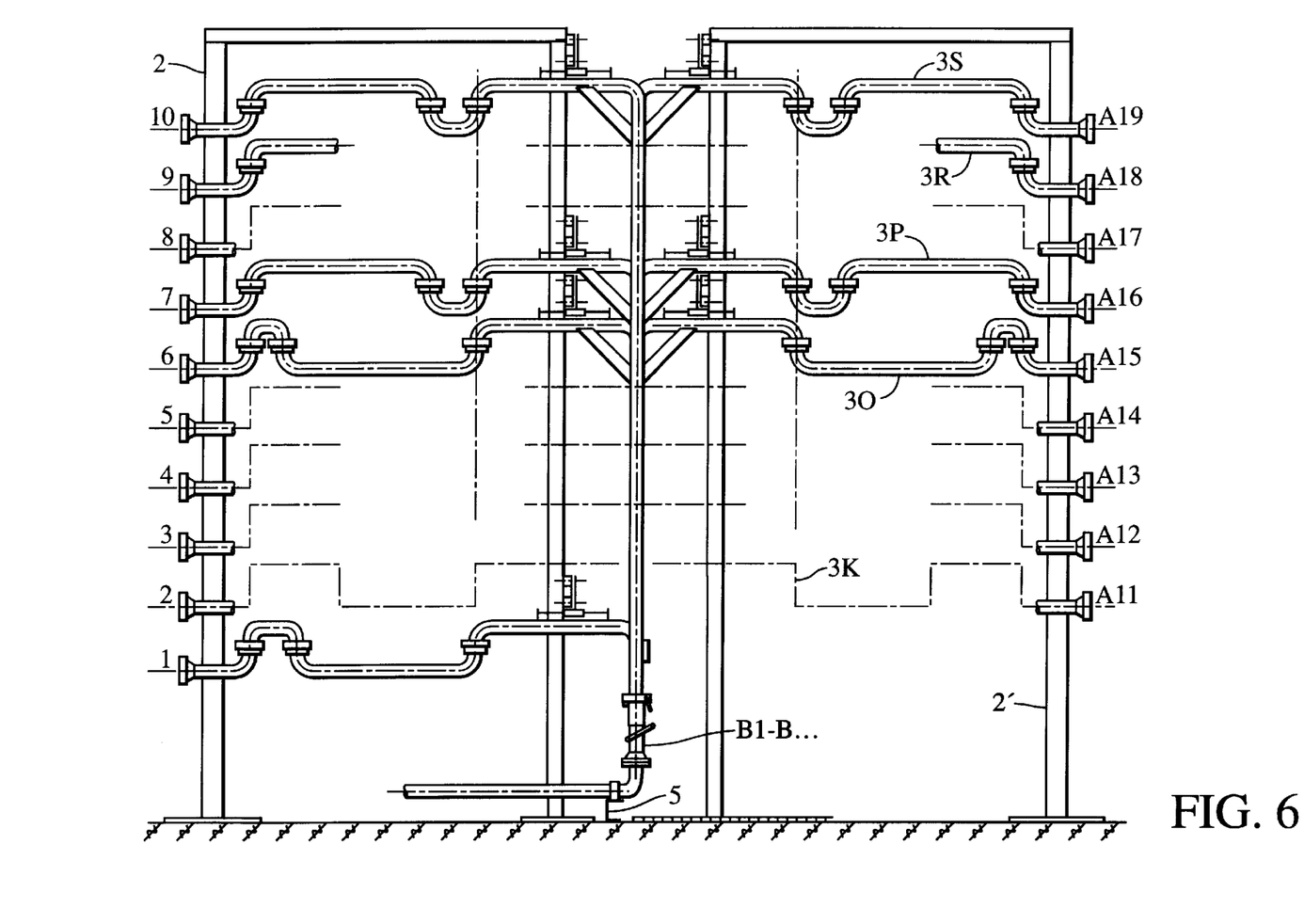
FIG. 6 is a side view of another provisional selective connection installation which constitutes a duplicated version of the installation from FIGS. 1 through 5.

There follows a detailed numerical example of implementation of the invention:

the FIG. 1 installation has 10 inputs and 21 outputs and in the duplicated example of FIG. 6 the number of inputs is not quite doubled (to 19) to leave enough room for the operator: there is provision here for some degree of flexibility to suit requirements, the rails are 5 m long for 21 outputs spaced by 0.25 m, for example; the total range of movement is around 0.37 m for a transverse overall dimension of the couplers of around 0.2 m and a column cross-section of around 0.1 m, the length of the first two articulated pipe sections is 1.7 m while the third section has a width of 1.2 m, the total height is 6 m with a minimal level at 1.15 m and a height of 0.9 m for the front plane, the inclined spacers 16B, . . . , 16J advantageously include polyurethane buffers, in the circular configuration the pipe sections have respective lengths from the centre of 1.05 m, 0.525 m and 0.6 m and the angular separation of the outputs is 10° for a reference line with a radius of 1.5 m, the range of movement of the articulated pipe is determined by an abutment joined to the intermediate section adapted to sweep out an angular sector delimited by two abutments attached to the internal section, the telescopic travel is 50 mm.

It goes without saying that the preceding description has been given by way of non-limiting example only and that numerous variants can be put forward by the person skilled in the art without departing from the scope of the invention.

For example, for short lengths of pipe (small number of outlets B) the support guides can be dispensed with even in the embodiments of FIGS. 1 to 6. As an alternative, supports can be provided even in the circular configuration.

Choosing a vertical coupling plane can have the advantage of enabling the telescopic section to be dispensed with, although this increases the range of movement required of each column.

I claim:

1. Installation for provisional selective connection of any one of an ordered plurality of first fixed sections (A1, . . . , A10; A'1, etc.) all having the same inside diameter to any one of an ordered plurality of second fixed sections (B1, etc.; B'1, etc.) all having the same inside diameter as the first fixed sections, including:

a vertical first support (2, 2') to which the plurality of first fixed sections is fixed, each at a specific level, an ordered plurality of articulated pipes (3A, etc.; 3'A) all having the same inside diameter as the first and second fixed sections, deformable independently of each other in stacked horizontal planes, a specific articulated pipe being connected to each first fixed section, a first ordered plurality of first coupling sections (4A, etc.; 4'A) all having the same inside diameter as the first and second fixed sections and each having a coupling flange in an imaginary coupling plane (P), the number of first coupling sections being equal to the number of first fixed sections, a support (5, 5') to which the second ordered plurality of second fixed sections is fixed, a second ordered plurality of second coupling sections (6A, etc.; 6'A) all having the same inside diameter as the first and second fixed sections and each having a second coupling flange parallel to the imaginary coupling plane, the number of second coupling sections being equal to the number of second fixed sections, a plurality of couplers (20, 21) each adapted to couple a first coupling section and a second coupling section, which installation is characterized in that:

each second coupling section (6A, etc.; 6'A) is connected directly to a second fixed section (B1, etc.; B'1, etc.), said second coupling sections having fixed positions parallel to the imaginary coupling plane and being regularly arranged facing a substantially horizontal reference line (L, L') in said plane at a level (HL) below the level of the first coupling sections, each articulated pipe is connected at the end opposite the end connected to the first fixed section to which it is connected to a tubular column (8A, etc.; 8'A) having the same inside diameter as the first and second fixed sections and extending vertically as far as a respective first coupling section, the respective lengths of the tubular columns being such that the first coupling sections are all at substantially the same level, each combination of a pipe, a tubular column and a first coupling section being provided with means for limiting movement of said combination along the whole of the reference line to within a given range of horizontal movement to either side of said reference line, the distance between adjacent second coupling sections and the given range of movement being greater than the diameter of the first coupling sections.

2. Installation according to claim 1 characterised in that the imaginary coupling plane (P) is horizontal.

3. Installation according to claim 1 characterized in that each articulated pipe (3A, etc.; 3'A, etc.) is formed of three rigid sections articulated to each other.

4. Installation according to claim 1 characterized in that the reference line (L) is substantially rectilinear.

5. Installation according to claim 4 characterised in that the ends of the articulated pipes are inserted in respective carriages (10A, etc) sliding on substantially horizontal coplanar rails (11A, etc) in a vertical plane substantially parallel to the reference line.

6. Installation according to claim 5 characterised in that said given range of movement is delimited at least in part by abutments (14, 15) carried by said ends and cooperating with said carriages.

7. Installation according to claim 6 characterized in that an inclined spacer (16B, etc.) is fixed to the end of each articulated pipe and to the associated column and carries buffers.

8. Installation according to claim 4 characterised in that the vertical support and the plurality of first fixed sections are divided into two sets on respective sides of a vertical plane through the rectilinear reference line.

9. Installation according to claim 1 characterized in that the reference line (L') is part of a circle.

10. Installation according to claim 9 characterised in that each articulated pipe is formed of three rigid sections articulated together and includes a spacer link (30) articulated to the end rigid sections the same length as the median rigid section and forming a pantograph with the rigid sections.

11. Installation according to claim 10 characterised in that the end rigid section to which a tubular column is connected is oriented radially.

12. Installation according to claim 1 characterized in that the second coupling sections (6A, etc.; 6"A) are mounted telescopically on the second fixed sections, perpendicularly to the imaginary coupling plane.

13. Installation according to claim 12 characterised in that said second sections are provided with pivoting manoeuvring levers (26).

14. Installation according to claim 12 or claim 13 characterised in that the second coupling sections include two jaws (20, 21) articulated at first ends to said second coupling sections perpendicular to the imaginary coupling plane and a locking device (22) adapted to hold second ends of said jaws in a closed configuration.

15. Installation according to claim 14 characterised in that said locking device (22) comprises clamping means.

16. Installation according to claim 15 characterised in that the clamping means are operated by a lever (23).

17. Installation according to claim 14 characterized in that the locking device is articulated to the second end of one jaw.

18. Installation according to claim 1 characterized in that the second coupling sections include sensors (24) for identifying the first coupling sections.

19. Installation according to claim 1 characterized in that a plug is disposed between a first coupling section and a second coupling section held in a bottom position.

* * * * *